Feb. 9, 1937.　　J. J. HUEBSCHER　　2,070,432
SPEED CONTROL SYSTEM FOR AUTOMOTIVE VEHICLES
Filed Jan. 17, 1936　　3 Sheets-Sheet 1

INVENTOR
JOHN J. HUEBSCHER
BY *Paul, Paul & Moore*
ATTORNEYS

INVENTOR
JOHN J. HUEBSCHER
BY Paul, Paul & Moore
ATTORNEYS

Feb. 9, 1937.     J. J. HUEBSCHER     2,070,432
SPEED CONTROL SYSTEM FOR AUTOMOTIVE VEHICLES
Filed Jan. 17, 1936     3 Sheets-Sheet 3
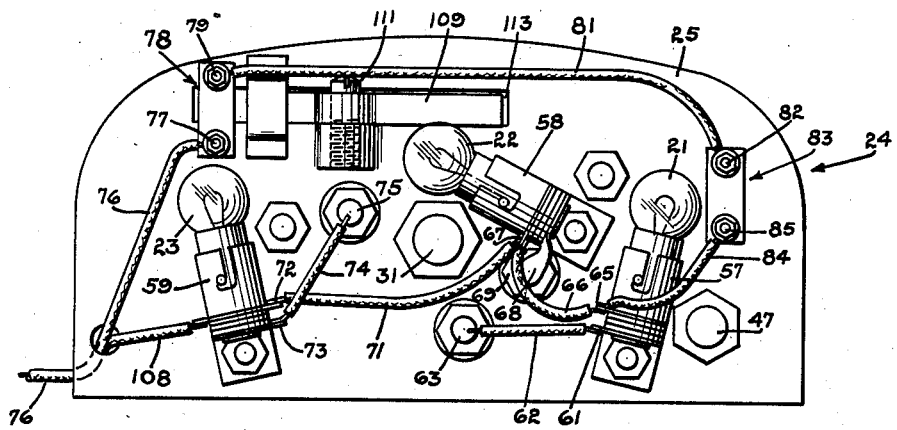
Fig. 4
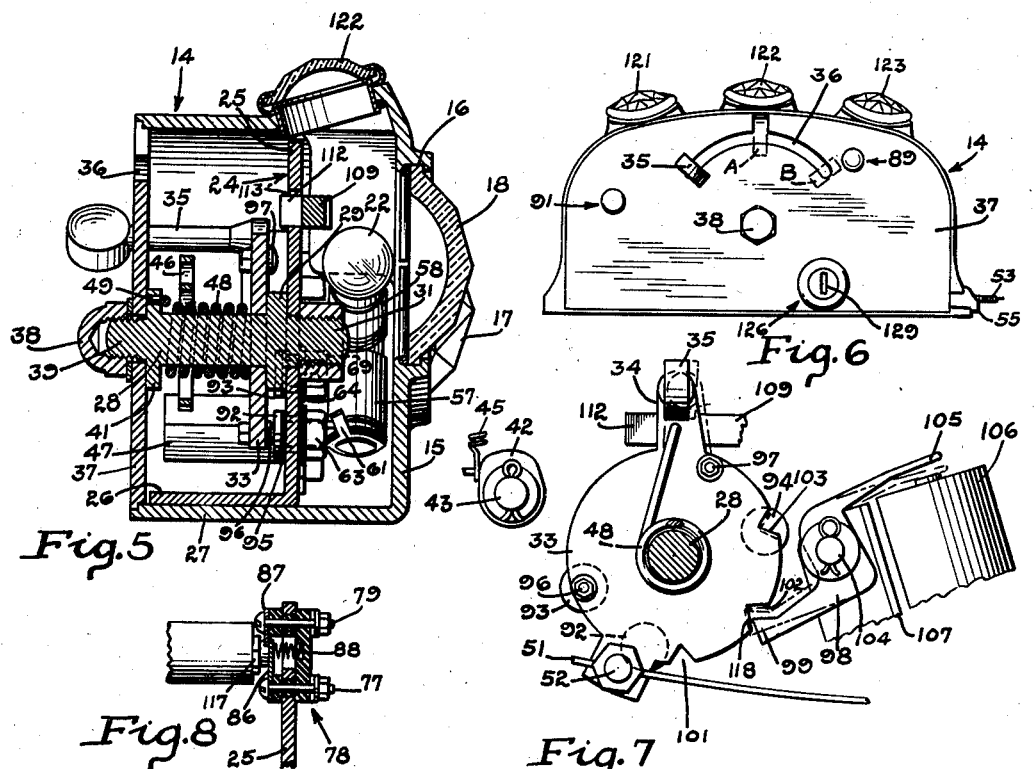
INVENTOR
JOHN J. HUEBSCHER
BY Paul, Paul H Moore
ATTORNEYS Patented Feb. 9, 1937

2,070,432

UNITED STATES PATENT OFFICE 2,070,432

SPEED CONTROL SYSTEM FOR AUTOMOTIVE VEHICLES

John J. Huebscher, Minneapolis, Minn., assignor to Zone-O-Trol Corporation of America, Inc., Minneapolis, Minn., a corporation of Minnesota Application January 17, 1936, Serial No. 59,639

12 Claims. (Cl. 177—311.5)

This invention relates to new and useful improvements in speed control systems, and more particularly to an improved system for controlling the speed of automotive vehicles, whereby the driver is constantly advised by color, the maximum speed at which is permitted to travel over each particular highway, or through certain zones or areas of a highway.

An important object of the invention is to provide an improved traffic control system which consists in dividing the highway into sections or zones, and indicating each zone by a different color, which colors represent the maximum or top speed at which a vehicle is permitted to travel through each zone, and a plurality of colored lights corresponding in number and color to the colors of the different zones being mounted on the vehicle and having an operative connection with the fuel feeding means of the vehicle engine and bearing a definite relation thereto, and means being provided for selectively operating said lights to match the color on the vehicle to the color of a given color zone of the highway, the connection between said lights and the fuel feeding means of the vehicle engine being such that the vehicle cannot be operated at a speed exceeding the maximum speed represented by the color of the light appearing on the vehicle, and the lights on the vehicle being so arranged that they may readily be seen by the public, whereby the public is constantly advised if the driver has adjusted the speed of his vehicle to fall within the maximum speed permitted by the color of the zone through which he is driving, or may be approaching.

A further object is to provide a speed control system for automotive vehicles which includes a plurality of different colored lights arranged at the front and rear of the vehicle, and dividing the highway into different zones or areas, each being indicated by a different color, and each of said colors representing a predetermined maximum speed of travel, whereby the driver is constantly reminded by color, of the maximum speed at which he may travel through each area or zone of the highway, and means being provided for selectively controlling the operation of said lights and at the same time adjusting the fuel feeding means of the vehicle engine so that the vehicle cannot be operated at a speed which will exceed the maximum speed permitted by the color of the light on the vehicle, whereby if the driver will operate his colored lights so that the color on the vehicle matches the color of each color zone through which he is passing, he will be assured of not violating any speed laws, and at the same time, traffic officers and others will be advised of the driver's intention to drive safely and abide by the speed laws.

Other objects of the invention reside in the unique construction of the speed control device provided on the vehicle for adjusting the fuel supply to the vehicle engine; in the unique arrangement of the switch mechanism provided on the speed control device, whereby the driver may conveniently, by the simple manipulation of a push button, reduce the fuel supply to the engine, to thereby reduce the speed of the vehicle to comply with the speed indicated by the color of a certain zone which the vehicle may be approaching; in the means provided on the speed control device, whereby the driver may conveniently reduce the speed of the vehicle from maximum to a selected lower speed, by the simple manipulation of a control button, and whereby the light on the vehicle corresponding to the color of the maximum speed desired is automatically turned on, and the others extinguished, whereby the public may readily note that the driver has adjusted the speed of the vehicle to comply with the speed laws; in the provision of means whereby the fuel feeding means of the vehicle engine may be conveniently locked in either low, medium, or high speed; and, in the provision of a comparatively simple and inexpensive speed control system for automotive vehicles, which readily lends itself for adoption as a national speed control system.

Other objects of the invention will appear from the following description and accompanying drawings and will be pointed out in the annexed claims.

In the accompanying drawings there has been disclosed a structure designed to carry out the various objects of the invention, but it is to be understood that the invention is not confined to the exact features shown as various changes may be made within the scope of the claims which follow.

In the drawings:

Figure 4 is a detail view showing the arrangement of the lights on the speed control device;

Figure 5 is a cross-sectional view on the line 5—5 of Figure 3;

Figure 6 is an exterior view of the speed control device as seen from the inside of the vehicle;

Figure 7 is a detail view, partially in section, showing the means for retaining the speed control device in adjusted position;

Figure 8 is a detail sectional view on the line 8—8 of Figure 2;

Figures 1, 9, 11:
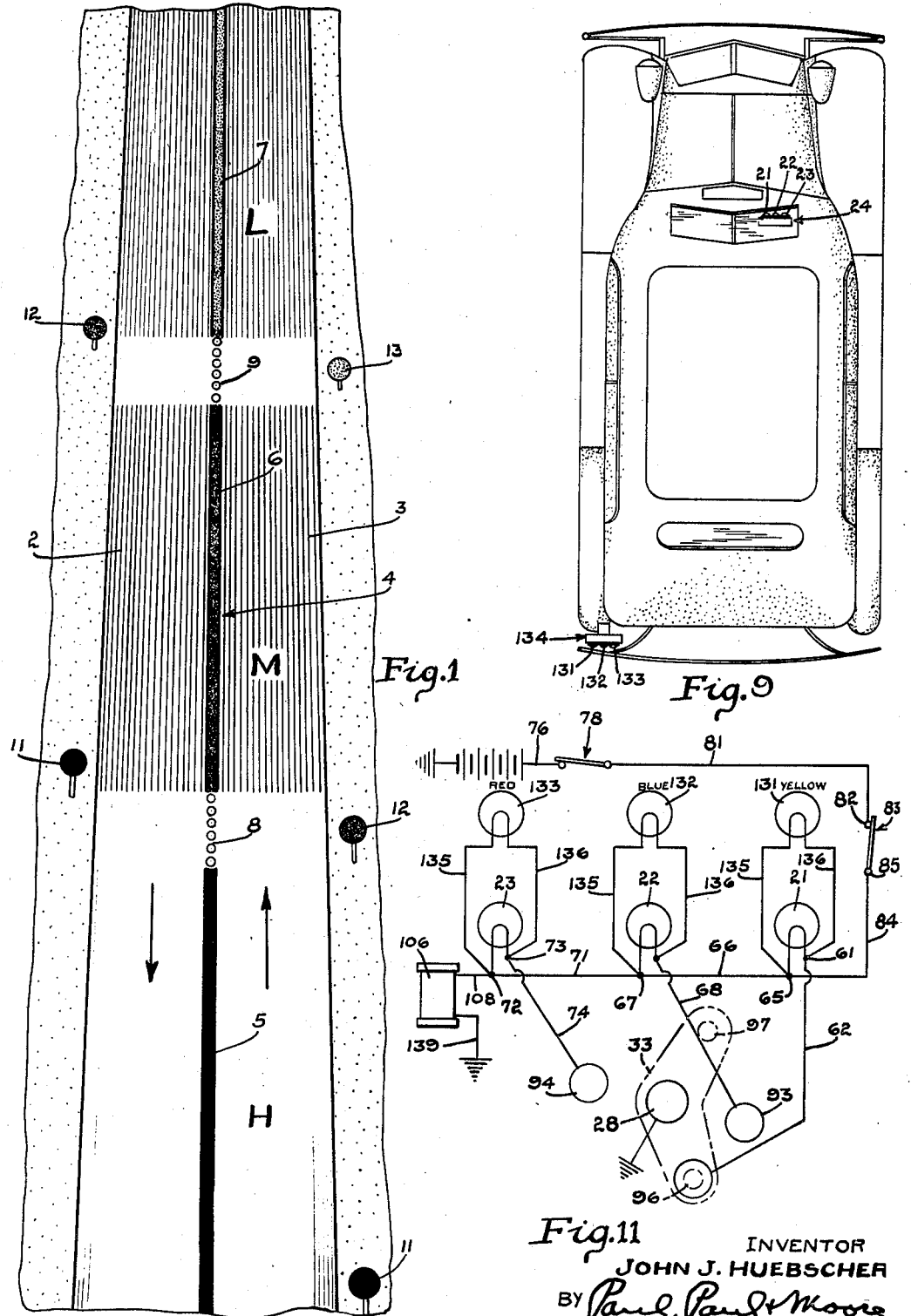
Figure 1 is a plan view of a portion of a highway showing it divided into a plurality of zones and each zone being indicated by a different color.
Figure 9 is a plan view of an automobile showing the speed control device arranged thereon.
Figure 11 is a wiring diagram of the speed control device.

In the selected embodiment of the invention here shown, there is illustrated in Figure 1, a portion of a highway shown divided into lanes 2 and 3 by a stripe extending along the center of the highway and generally indicated by the numeral 4. It is now common practice to divide highways into two or more lanes by means of suitable marks extending lengthwise of the highway, but at present, these dividing marks are usually of a single color, if colored at all.

An important feature of the present invention resides in dividing the highway into different sections or zones by means of different colors, and each color representing the top or maximum speed at which the vehicle may travel through each color zone. In Figure 1, I have shown a section of highway divided into three zones marked H, M, and L, which zones, I propose to indicate by different colors as, for example; H representing high speed, may be red; M, medium speed, may be blue; and L, representing low speed, may be yellow. I have found it adequate to merely color the dividing line or stripe 4, and, in Figure 1, the numeral 5 is a red line, indicating to the driver that he may travel at high speed; the numeral 6 a blue line, indicating a moderate speed zone; and the numeral 7 represents a yellow line, indicating to the driver that he must operate his car at a relatively lower or safe speed. The top or maximum speeds permitted through the different zones along the highway may be determined by proper authorities and may be, for example, thirty, forty-five, and sixty miles per hour, respectively, for the yellow, blue, and red.

The stripe or line 4 is preferably broken between adjacent color zones, as indicated at 8 and 9 in Figure 1, and these broken sections are preferably composed of groups of small reflectors embedded in the surface of the highway and arranged to reflect the light rays of the headlights of approaching vehicles, as they travel over the highway at night, thereby to more readily attract the driver's attention and inform him that he is approaching another color zone, which may require a readjustment of the speed of his vehicle. If desired, these small reflectors may comprise colored reflecting surfaces corresponding in color to the color of the stripe or line which follows them in the direction of travel of the vehicles.

To further attract the attention of the driver, suitable colored warning signs 11, 12, and 13, may be stationed along the highway at the approach to each color zone, and these signs are preferably provided with suitable reflecting surfaces or beads, colored to match their respective color zones, and whereby the color zones may more readily be seen at night, as a result of the rays of the vehicle headlights being projected against the beads on said signs. By thus dividing the highway into different color zones, and the colors of said zones representing the maximum or top speeds at which the vehicle may travel through the respective zones, the driver is constantly reminded of the maximum speed permitted over each section of highway, and he will therefore tend to keep his car within the permitted speed limit.

Another important feature of the invention resides in the provision of a speed control device mounted on the vehicle and comprising a plurality of colored lights, which correspond in number and color to the colors used in zoning the highway. The speed control device supported on the vehicle is generally indicated by the numeral 14, and comprises a suitable casing 15 having a plurality of openings 16 in the front wall thereof, provided with colored lenses 17, 18, and 19, the colors of which correspond to the colors of the highway as, for example; 17 may be yellow; 18, blue; and 19, red. Small light bulbs 21, 22, and 23 are mounted within the casing 15, and are adapted to be progressively turned on or off, as will subsequently be described.

The operating mechanism within the casing 15 is shown supported upon a suitable frame, generally indicated by the numeral 24, and shown comprising an upright wall 25 having a base portion 26 adapted to be seated upon the bottom wall 27 of the casing 15, as clearly illustrated in Figure 5. Suitable means, not shown, is provided for securing the frame 24 in position within the casing 15.

A stud 28 is secured to the frame 24 and projects laterally therefrom. This stud is shown having a flange 29 seated against the upright wall 25 of the frame 24, and its threaded terminal 31 projects through the wall 25 and has a nut engaged therewith for rigidly securing the stud 28 to the frame. A disk 33 is rotatably mounted upon the stud 28 and has an arm 34 provided with an operating handle 35 which projects through a slot 36 provided in a cover plate 37 which provides a closure for the open side of the casing, as clearly illustrated in Figures 5 and 6. The cover plate is secured in position by a nut 38 received in threaded engagement with the threaded terminal 39 of the stud. The stud is preferably provided with a flange 41 against which the cover plate 37 is clamped by the nut 38.

Figure 2:
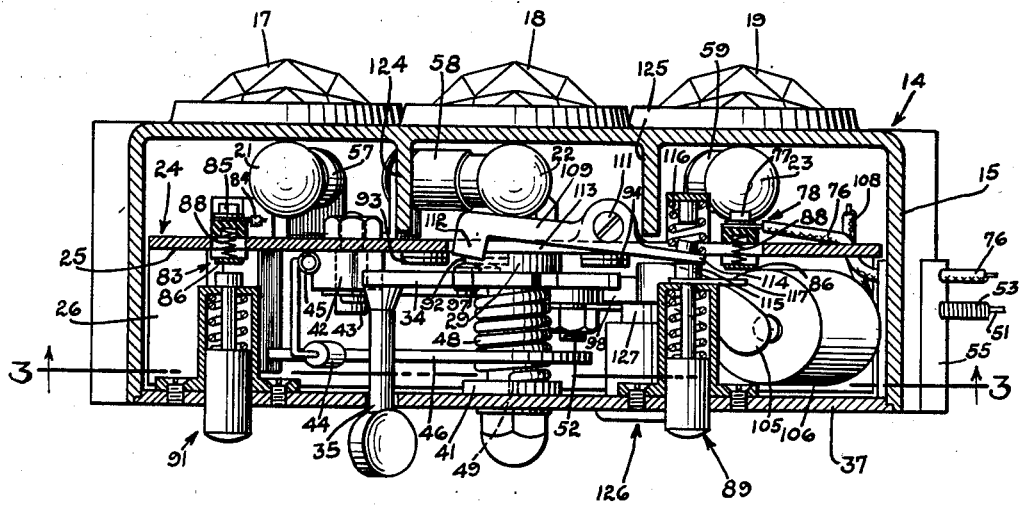
Figure 2 is a sectional plan view substantially on the line 2—2 of Figure 3, showing the general construction of the speed control device.
Figure 3:
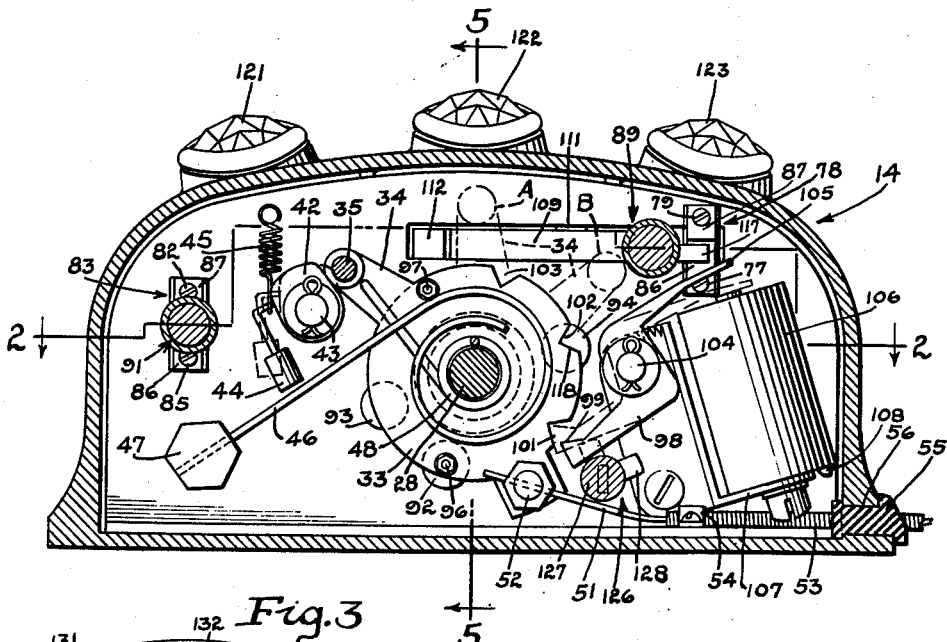
Figure 3 is a vertical sectional view on the line 3—3 of Figure 2.

The arm 34 of the disk 33 is normally seated against a stop 42, shown pivotally mounted upon a pin 43 secured to the wall 25 of the frame 24, as best shown in Figures 2 and 3. A small hammer 44 is carried by the stop 42 and is normally held in the dotted line position, shown in Figure 3, by a spring 45. The hammer 44 is adapted to strike a suitable gong 46, having one end fixedly secured to a post 47 secured to the wall 25, and having its opposite free end coiled about the stud 28 in spaced relation thereto. A suitable torsion spring 48 is shown coiled about the stud 28 and has one end anchored to the flange 41, as shown at 49, and its opposite end suitably secured to the arm 34 of the disk, as shown in Figures 3 and 7. The tension in the spring 48 constantly urges the arm 34 in a direction to contact the stop 42, as will be clearly understood by reference to Figure 3. The stop 42 is so arranged that when the arm 34 impinges thereagainst, the stop will relatively rotate upon the pin 43, whereby the hammer 44 will strike the gong 46 and thereby sound an alarm.

One end of a wire 51 is shown secured to the lower portion of the disk 33 by a suitable swivel connection, generally indicated by the numeral 52. The opposite end of the wire is suitably connected to the fuel feeding means of the vehicle in a manner similar to that shown and described in my patent, No. 2,019,976. The wire 51 is slidably supported in a flexible conduit 53, one end of which is fixedly secured to the base portion 26 of the frame 24 by a suitable clip 54, as shown in Figure 3. To facilitate removing the mechanism from the casing 15, the cable 53 may be supported in a block 55, preferably shaped as shown in Figures 2 and 3, and which is slidably received in an open-ended slot 56 provided in the lower portion of the casing 15.

The light bulbs 21, 22, and 23 are shown supported in suitable sockets 57, 58, and 59, respectively, secured to the plate 25 of the frame 24 in insulated relation. In the device, as here shown, the bulbs 21, 22, and 23 are of the usual two contact type, and each socket is therefore shown provided with two electrical terminals. The contact 61 of the socket 57 is connected by a wire 62 to a terminal 63 secured to the frame 24 in insulated relation, as best shown at 64 in Figure 5. The contact 65 of the socket 57 is connected by a wire 66 to the contact 67 of the contact 58, and the other contact 68 of said socket is electrically connected to a terminal 69 secured in insulated relation to the frame 24. A wire 71 connects the contact 67 of the socket 58 to the contact 72 of the socket 59, and the contact 73 of said socket is connected by a wire 74 to a terminal 75 similar to the terminals 63 and 69.

Electrical energy is supplied to the bulbs 21, 22, and 23 from a wire 76 which leads from the usual battery of the vehicle, to the contact 77 of a suitable control switch, generally indicated by the numeral 78, shown in Figures 2, 3, and 6. The other contact 79 of the switch 78 is connected by a wire 81 to the terminal 82 of a control switch, generally indicated by the numeral 83, and shown in Figures 2, 3, and 6. A wire 84 connects the terminal 85 of the switch 83 to the contact 65 of the socket 57 of the yellow light bulb 21, as clearly illustrated in Figures 4 and 11.

The switches 78 and 83 are normally closed, and may be constructed as shown in Figure 8, which is a detail sectional view of switch 78. As here shown, the terminal 77 is electrically connected to a movable contact 86, and the terminal 79 is connected to a relatively fixed contact 87. A spring 88 is shown normally holding the contact 86 in electrical engagement with the fixed contact 87. The switches 78 and 83 are provided with spring-actuated push buttons, generally indicated by the numerals 89 and 91, respectively, which push buttons are supported in the cover plate 37 of the housing 15. These push buttons are so arranged that when they are pushed inwardly, they will open their respective switches and thereby temporarily break the circuit to the light bulbs, as will subsequently be described.

To complete the circuit to the light bulbs 21, 22, and 23, means is provided for grounding the terminals 63, 69, and 75 thereof. Such means is best shown in Figures 2, 3, and 4, wherein it will be noted that the terminals 63, 69, and 75 are provided with contacts 92, 93, and 94, respectively, located at the opposite side of the wall 25, and insulated therefrom, as best shown at 95 in Figure 5. A pair of contacts 96 and 97 are secured to the disk 33 in electrical relation with respect thereto, as shown in Figure 3. When the disk is in its normal position, shown in Figure 3, the contact 96 is engaged with the fixed contact 92, whereupon current is supplied to the yellow light bulb 21 because of the wire 62 electrically connecting the terminal 92 to the socket 57 of said bulb. When the operating handle 35 is rotated from the full to the dotted line position, shown at A in Figures 3 and 6, the contact 96 will move out of engagement with the contact 92, and will subsequently electrically engage the contact 93, whereby the yellow light will be extinguished and the blue light will be turned on. In like manner, when the operating handle is moved from position A to position B in Figure 6, the contact 96 will move out of engagement with the contact 93 and the contact 97 will engage the contact 94, thereby causing the blue light to go out and the red light to be turned on. It will thus be understood that the yellow light is normally on when the disk is in its normal low speed position, and that the other lights are progressively turned on as the operating handle is moved from low to high speed position.

Means is provided for locking the disk 33 in adjusted position and is shown comprising a latch member 98 having a terminal 99 adapted to be received in a plurality of notches 101, 102, or 103. The latch member 98 is pivotally supported upon a pivot 104 secured to the wall 25, and has an arm 105 adapted to be attracted by an electromagnet 106 suitably supported upon the wall 25 by a bracket 107, as best shown in Figure 3.

The electro-magnet 106 has one end grounded to the frame 24 by a wire 139, and its opposite end is connected to the socket 59 by a wire 108, as shown in Figures 4 and 11. By thus grounding one side of the electro-magnet 106 to the frame 24, current is constantly flowing therethrough when the speed control device is normally functioning, whereby the arm 105 of the latch member 98 is attracted thereby, with the result that the latch member 98 is moved into locking engagement with one of the notches provided in the periphery of the disk 33. The electro-magnet thus has the effect of a spring upon the arm 105 to hold the terminal 99 of the latch member in engagement with the periphery of the disk 33, so that when the operating handle is moved from low speed position, shown in full lines in Figure 6, to the medium speed position, indicated at A, or to the high speed position B, the terminal of the latch member will engage the notches 102 and 103 and lock the disk in position to light either the blue or the red light, depending, of course, upon the position of the operating handle 35.

The push buttons 89 and 91 provide means for quickly and conveniently returning the disk from high to medium or low speed position, as may be desired. For example, when the operating lever is at medium or high speed position, and it is desired to return it to low speed position, the operator will press the button 91, which preferably is colored yellow, to correspond to the color of the yellow light 21. When the push button 91 is actuated, the flow of current through the power wire 76 is temporarily interrupted, whereupon the electro-magnet 106 becomes deenergized and allows the latch member 98 to be moved out of locking engagement with the disk 33, whereby the disk is instantly returned to low speed position by the action of the torsion spring 48. Such movement of the disk will cause the red and blue lights to extinguish and the yellow light will be turned on, and, at the same time, the fuel supply to the vehicle engine will be adjusted to reduce the speed of the vehicle engine, and therefore the speed of the vehicle.

Means is provided whereby when the driver wishes to reduce the speed of the car from high to medium and actuates the push button 89, the disk 33 will be interrupted at the medium speed position, whereby the blue light is turned on, and the fuel feeding means accordingly adjusted. This push button 89 is therefore preferably colored blue to indicate to the driver that when he depresses said button, the blue light will operate and the fuel supply means to the car will be adjusted for medium speed.

The means provided for thus interrupting the return movement of the disk 33 at the medium speed position, is best shown in Figures 2 and 3, and comprises a member 109 pivotally supported upon a pivot 111, secured to the frame 24 and having a hook-shaped terminal 112 movably supported in a slot 113 provided in the wall 25. The hook-shaped terminal 112 is adapted to be moved into the path of the arm 34 of the disk 33, thereby to interrupt the return movement of the disk at the blue or medium speed position, when the blue button 89 is actuated.

As shown in Figure 2, the member 109 has an end portion 114 positioned to be engaged by the inner terminal 115 of the blue button 89. A suitable spring 116 is engaged with the end portion 114 of the member 109 and constantly urges said end portion into engagement with the inner terminal 115 of the push button 89. It is also to be noted that the stem of the push button 89 has a finger 117 secured thereto, which is arranged to engage the movable contact 86 of the switch 78 when the push button is actuated, thereby to break the circuit through the switch 78.

The above described parts are so arranged and proportioned that when the blue button 89 is actuated to open the switch 78, the hooked terminal 112 of the member 109 will move into the path of the arm 34 of the disk 33 before the switch 78 is opened, and when the switch 78 is subsequently opened, the electro-magnet 106 is deenergized, thereby releasing the disk 33 whereby the arm 34 will engage the hooked terminal 112 before the blue button 89 is returned to its normal position. The hooked terminal 112 will thus temporarily retain the disk 33 in medium speed position until the blue button 89 is returned to its normal position to permit the switch 78 to close the circuit to the electro-magnet 106.

The moment, however, that the circuit to the electromagnet 106 is again completed, the latch member 98 will be moved into engagement with the notch 102 of the disk 33, and as the terminal 99 thereof engages the wall 118 of said notch, it will impart a slight rearward movement of the disk, whereby the arm 34 will release its pressure against the hooked terminal 112 of the member 109. When the pressure of the arm 34 against the hooked terminal 112 is thus released, the member 109 will be returned to its normal position, as shown in Figure 2, by the action of the spring 116.

From the foregoing, it will be noted that the driver may conveniently switch the speed control device from red to blue, or red to yellow, by the simple manipulation of the push buttons 89 and 91. Should the driver be traveling at high speed, the operating handle would be at position B in Figure 6, and the red light would be on, which will advise the public that the fuel supply means of the vehicle engine is so adjusted that the vehicle may be operated at high speeds. Should the driver, however, approach a blue zone, he will depress the blue button 89, whereupon the disk is immediately returned to medium or the blue light position, and, in like manner, should he approach a yellow zone, he will depress the yellow button 91, which will cause the disk to return to the low speed or yellow light position.

To enable the driver to readily note if the light bulbs 21, 22, and 23 are functioning, small prism lenses 121, 122, and 123 are provided in the upper wall of the housing, which are in direct communication with the light chambers provided within the housing, as clearly illustrated in Figure 5. Suitable partitions 124 and 125 are preferably provided between the light bulbs, as shown in Figure 2, to confine the light rays from the various bulbs to their respective lenses.

Means is also provided for locking the disk 33 in adjusted position, whereby the fuel feeding means may be fixed in any given position so that the car cannot be operated beyond a predetermined speed. Such a locking means is generally indicated at 126 in Figure 3 and may, for the purpose of illustration, comprise a rotatable member 127 having a lug 128 movable into and out of engagement with the latch member 98, whereby the disk 33 may be locked in any one of its three positions. A suitable key slot 129 is provided in the cover member 37 of the casing, as shown in Figure 6, through which a suitable key may be inserted for the purpose of rotating the member 127 and moving the lug 128 into or out of locking engagement with the latch member 98.

Figure 10:
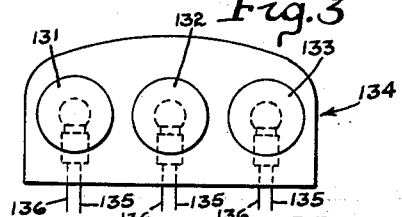
Figure 10 is a detail view diagrammatically illustrating the light box or housing provided at the rear of the vehicle body.

Another feature of the invention resides in the provision at the rear of the vehicle, of a series of lights 131, 132, and 133, corresponding in number and color to the lights provided in the speed control device 14. As shown in Figures 9 and 10, the lights 131, 132, and 133 are supported in a suitable casing 134, secured to the rear portion of the vehicle body, whereby the lights thereof may readily be seen by motorists and others approaching from the rear. The casing 134 is provided with suitable openings in which colored lenses, similar to the ones shown at 17, 18, and 19 are secured.

The lights 131, 132, and 133 at the rear of the vehicle are connected in parallel with their respective lights 21, 22, and 23 at the front of the vehicle, by suitable wires 135 and 136, as diagrammatically illustrated in Figure 11, whereby when any one of the lights at the front of the vehicle is turned on, the corresponding light at the rear of the vehicle will be functioning, thereby indicating to the public from both front and rear of the vehicle, the adjustment of the fuel feeding means of the engine. Figure 11 illustrates the preferred manner of electrically connecting the various elements of the speed control device 14, and also illustrating the parallel connection of the lights at the front and rear of the vehicle.

From the foregoing, it will be noted that the lights of the speed control device, and also the lights at the rear of the vehicle are controlled by manipulation of the disk 33, which is adapted for manual operation in one direction by the hand lever 35 to increase the amount of fuel fed to the engine, and is movable in the opposite direction by the spring 48, when the push buttons 89 and 91 are actuated.

*Operation*

The speed control device 44 is suitably mounted at the front of the vehicle inside of the vehicle body with the lenses 17, 18, and 19 so positioned that they may readily be seen from the front of the vehicle. The lights, as hereinbefore stated, are so arranged that one of the lenses is always illuminated, when the vehicle engine is operating, it being understood that the power wire 76 of the control device 14 is so connected in the control system of the vehicle that when the ignition switch of the engine is turned on, the speed control device is made operative. The lenses 17, 18, and 19 are convexed, as shown in Figures 2 and 5, whereby the particular lens which is illuminated may be readily seen from the side of the vehicle, as well as from the front. Thus, it will be seen that the illuminated light of the speed control device at the front of the vehicle cooperates with the correspondingly colored light at the rear of the vehicle to advise the public from all sides of the vehicle, of the adjustment of the fuel feeding means of the vehicle engine, it being remembered that each color represents a top or maximum speed at which the vehicle may travel.

The disk 33 is normally retained in the position shown in Figure 3, whereby the contact 96 is electrically engaged with the contact 92 of the yellow light, thereby closing the circuit to said light. When the disk 33 is thus positioned, the fuel feeding means to the engine will be positioned for low speed as, for example, thirty miles per hour. It is to be understood that in the traffic control system herein disclosed, the driver will control the speed of his car in accordance with the particular color zone which he may be approaching, or is passing through. For example, when approaching or passing through a yellow zone, he will adjust the speed control device 14 to show the yellow lights at the front and rear of the vehicle, and when passing through a blue zone, either the yellow or blue lights must be on, thereby indicating to the public that he cannot drive beyond the top speed permitted by the blue zone, which, for illustration, may be forty-five miles per hour. In like manner, when he approaches or enters a red zone, which color, in the present case, represents high speed, or sixty miles per hour or over, he will adjust the speed control device to increase the fuel supply to the engine, which is readily accomplished by simply moving the lever 35 to the dotted line position B in Figure 6, which will extinguish the yellow and blue lights, and will turn on the red lights. In other words, to afford maximum safety in speed control, the speed control device on the vehicle must not be adjusted to show a color representing a top or maximum speed greater than that represented by the color of the zone through which the vehicle may be passing.

The speed control device 24 is so arranged that it may readily and conveniently be reset from the driver's seat to match the color on the vehicle with the color of the zone which the vehicle may be approaching. For instance, if the driver is traveling at high speed and has the lever 35 of the speed control device positioned as indicated at B in Figure 6, wherein the red lights on the vehicle are functioning, he may readily change the color on the vehicle to correspond to a color zone which he may be approaching by pressing either the push button 89 or the button 91, which is determined by the particular color of the zone which he is approaching.

The push button 89, as hereinbefore stated, is preferably colored blue to correspond to the blue zone, and when this button is depressed by the driver, the circuit to the electro-magnet 106 is temporarily broken, whereby the disk 33 is released and is returned to the dotted line position A, shown in Figure 3, whereby the arm 34 impinges against the hooked terminal 112 of the pivot member 109, as previously described. When the driver releases the button 89, the circuit through the power wire 81 is completed through the switch 78, whereby the electro-magnet 106 is again energized and attracts the arm 105 to move the latch member 98 into locking engagement with the notch 102 of the disk 33. The wall of the notch 102 engaged by the end of the latch 98, as hereinbefore stated, is so shaped that when the terminal of the latch 98 engages the notch, it slightly rotates the disk in a counter-clockwise direction, when viewed as shown in Figure 3, whereupon the pressure of the arm against the terminal of the pivoted member 109 is released, and thus permits the spring 116 to move the hooked terminal 112 out of the path of the arm 34. The disk 33 will be retained in its intermediate or blue light position until the electro-magnet 106 is again deenergized, or, until the driver grasps the operating handle 35 and moves it to the right to the high speed position B, to again adjust the fuel feeding means for high speed driving.

If the driver is traveling in either a blue or a red zone, and approaches a yellow zone, he will depress the yellow button 91, whereupon the disk 33 is returned to its normal low speed position, with the result that the blue and red lights are turned off and the yellow lights turned on. When the disk is so positioned, the fuel feeding means of the vehicle engine is adjusted for low speed driving and the yellow lights are turned on to correspond to the color of the low speed zone.

It will thus be seen that the driver will control the speed of his car in accordance with the colors of the various color zones of the highway, and he will be constantly reminded, by color, of road hazards which he may be approaching, or other areas or districts where it is necessary that he reduce the speed of his vehicle to within a predetermined figure to prevent accidents.

The line or stripe along the center of the highway which divides it into lanes is, as hereinbefore stated, colored to represent certain predetermined top or maximum speeds, and suitable signs 11, 12, and 13, may be fixed along the highway, as shown in Figure 1, to provide additional means for attracting the attention of the driver so that he is constantly warned at all times, by color, of the maximum speeds permitted through the various zones which he may be approaching along the highway, whereby he will have ample time to reduce the speed of his vehicle to a figure falling within the maximum speed permitted through each color zone.

The novel speed control system herein disclosed, is very simple and inexpensive, and, as a result, readily lends itself for commercial use. It does not necessitate any changes in the usual control mechanism of the vehicle, other than connecting the power wire 76 to the electric wiring system of the vehicle whereby when the ignition switch is turned on, the speed control device is made operative. It is now customary to divide highways into two or more lanes by means of colored stripes or lines made on the surface of the pavement lengthwise thereof, and the present invention simply requires that each highway first be divided into sections or zones, in accordance with the maximum speeds permitted through said zones or district, and that each speed be indicated by a certain color as, for example, yellow, blue, or red, as set forth in this application, and each color representing the maximum or top speed permitted through its respective zone. These color zones constantly remind the driver of the maximum speed permitted over each highway, or sections, or areas thereof, and the speed indicating lights on the vehicle constantly advise the public of the driver's intention to drive with safety and within the permitted speed limits of each zone or district.

In the foregoing, I have used the colors yellow, blue, and red to indicate low, medium, and high speeds, respectively, but it is to be understood that other suitable colors may be used without departing from the scope of the invention. The top speed, represented by each color, is to be determined by proper authorities and may be varied without changing the operation of the system. Because of its simplicity, it may readily be nationalized, whereby all vehicles would be equipped with a series of similarly colored lights, which, as herein set forth, are operatively connected to the fuel feeding means of the vehicle engines and have means for selectively controlling them to match the color zones of the highway, whereby the fuel feeding means of the vehicle is adjusted to limit the speed of the vehicle to that represented by the color appearing on the vehicle, and also whereby the public is constantly advised of the driver's intention to abide by the permitted speed limits, established for each district or zone.

I claim as my invention:

1. The method of regulating automotive traffic on a highway traveled over by a vehicle having a selectively adjustable speed limiting device and an individual signal for each speed limit, which consists in marking the highway off into different speed limit zones by different colored areas, one color for each zone visible through substantial portions of said zone, manually adjusting the speed control device to correspond to the speed limit indicated in the zone being traversed, and displaying a signal on said vehicle which is visible outside the same corresponding to the speed limit signal of the last said zone and to the particular adjustment of said speed control device.

2. The method of regulating automotive traffic on a highway traveled over by a vehicle having a selectively adjustable speed limiting device and an individual color signal for each speed limit, which consists in marking the highway off into different speed limit zones by different colors, one for each zone visible through substantial portions of said zone, manually adjusting the speed control devices to correspond to the speed limit indicated in the zone being traversed, and displaying a color signal on said vehicle which is visible outside the same corresponding to the speed limit color of the last said zone and to the particular adjustment of said speed control device.

3. The method of regulating an automotive vehicle having a selectively adjustable speed limiting device and an individual colored signal for each speed limit on a highway having different marked off speed limit zones and different colored signals for each zone visible through substantial portions of said zones, which consists in manually adjusting the speed control device to correspond to the speed limit indicated in the zone being traversed, and displaying a colored signal on said vehicle which is visible outside the same corresponding substantially in color to the speed limit color signal of the zone in which the vehicle is traveling and to the particular adjustment of said speed control device.

4. The method of marking a highway for regulating automotive traffic thereover which consists in dividing the highway into speed limit zones and indicating said zones by different colored signals, one color for each zone visible through substantial portions of said zone.

5. The method of regulating automotive traffic on a highway traveled over by a vehicle having a selectively adjustable speed limiting device and an individual signal for each speed limit, which consists in marking the highway off into different speed limit zones by different colors on the highway, one color for each zone in the form of a colored line dividing oppositely moving lanes of traffic on said highway and extending through substantial portions of said zone, manually adjusting the speed control device to correspond to the speed limit indicated in the zone being traversed, and displaying a color signal on said vehicle which is visible outside the same corresponding to the speed limit color of the line of the said last zone and to the particular adjustment of said speed control device.

6. The method of marking a highway for regulating automotive traffic thereover which consists in dividing the highway into speed limit zones and indicating said zone by different colored lines on the highway, one line of a different color for each zone dividing the oppositely moving lanes of traffic on said highway and visible through substantial portions of said zone.

7. A motor vehicle speed control device comprising a movable member having an operative connection adapted to be connected with the engine to control the amount of fuel fed to the engine, said member being movable manually to predetermined positions to feed predetermined amounts of fuel to the engine in accordance with each position, means tending normally to return said member to low speed position, a plurality of different colored lights carried by the vehicle, contacts associated with said movable member, electrical circuits including said lights and contacts, one of said lights being illuminated in accordance with each predetermined position of said movable member, electromagnetic means for retaining said movable member in a selected position, and manually operable means carried by said device for rendering said electromagnetic means inoperative and releasing said movable member to permit it to return to a selected lower speed position.

8. A motor vehicle speed control device comprising a movable member having an operative connection adapted to be connected with the vehicle engine to control the amount of fuel fed to the engine, means tending to return said movable member to a low speed position to permit a relatively small amount of fuel to be fed to the engine but being movable manually to predetermined higher speed positions to permit greater amounts of fuel to be fed to the engine up to that giving the selected higher speed, electromagnetic means for retaining said movable member in the selected higher speed position, and manually operable means for rendering said electromagnetic means inoperative and releasing said movable member to permit it to return to a selected lower speed position.

9. A motor vehicle speed control device comprising a movable member having an operative connection adapted to be connected with the vehicle engine to control the amount of fuel fed to the engine, means tending to return said movable member to a low speed position to permit a relatively small amount of fuel to be fed to the engine but being movable manually to higher speed positions to permit greater amounts of fuel to be fed to the engine up to that giving a predetermined higher speed, electromagnetic means for retaining said movable member in a selected higher speed position, manually operable means for rendering said electromagnetic means inoperative and releasing said movable member to permit it to return to the next lower predetermined position, and additional manually operable means for rendering said electromagnetic means inoperative and releasing said movable member to permit it to return to said normal low speed position.

10. A motor vehicle speed control device comprising a movable member having an operative connection adapted to be connected with the engine to control the amount of fuel fed to the engine, said member being movable manually to predetermined positions to feed predetermined amounts of fuel to the engine in accordance with each position, means tending normally to return said member to low speed position, a plurality of different colored lights carried by the vehicle, contacts associated with said movable member, electrical circuits including said lights and contacts, one of said lights being illuminated in accordance with each predetermined position of said movable member, electromagnetic means normally energized when the vehicle engine ignition circuit is closed for retaining said movable member in selected position, and manually operable means for temporarily opening the circuit of said electromagnetic means and thereby permitting said movable member to return to a selected lower speed position.

11. A motor vehicle speed control device comprising a movable member having an operative connection adapted to be connected with the vehicle engine to control the amount of fuel fed to the engine, said movable member normally occupying a low speed position to permit a relatively small amount of fuel to be fed to the engine but being movable manually to predetermined higher speed positions to permit greater amounts of fuel to be fed to the engine up to that giving the selected higher speed, electromagnetic means for retaining said movable member in a selected higher speed position, the circuit of said electromagnetic means being operatively connected with the engine ignition switch whereby said electromagnetic means is energized when said switch is closed, manually operable means for temporarily opening the circuit of said electromagnetic means to permit said movable member to return to a selected lower speed position, and means for arresting the movement of said movable member in the selected position while said circuit is opened.

12. A motor vehicle speed control device comprising a movable member having an operative connection adapted to be connected with the vehicle engine to control the amount of fuel fed to the engine, said movable member normally occupying a low speed position to permit a relatively small amount of fuel to be fed to the engine but being movable manually to higher speed positions to permit greater amounts of fuel to be fed to the engine up to that giving the predetermined higher speed, electromagnetic means normally energized while the engine ignition circuit is closed for retaining said movable member in the selected higher speed position, manually operable means for temporarily opening the circuit to and thereby render said electromagnetic means inoperative and permit said movable member to return to the next lower predetermined position, means for arresting movement of said movable member in said position while said circuit is opened, and additional manually operable means for temporarily opening said circuit to render said electromagnetic means inoperative and permit said movable member to return to said normal low speed position.

JOHN J. HUEBSCHER.